(12) United States Patent
Kabatzke et al.

(10) Patent No.: US 7,525,209 B2
(45) Date of Patent: Apr. 28, 2009

(54) METHOD FOR THE OPERATION OF A WIND TURBINE GENERATOR SYSTEM

(75) Inventors: Wolfgang Kabatzke, Geesthacht (DE); Kay Richter, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 41 days.

(21) Appl. No.: 11/622,249

(22) Filed: Jan. 11, 2007

(65) Prior Publication Data
US 2007/0194574 A1 Aug. 23, 2007

(30) Foreign Application Priority Data
Feb. 21, 2006 (DE) .................. 10 2006 007 919

(51) Int. Cl.
*F03D 9/00* (2006.01)
*H02P 9/04* (2006.01)
(52) U.S. Cl. .......................... 290/44; 290/55
(58) Field of Classification Search ............... 290/43, 290/44, 54, 55
See application file for complete search history.

(56) References Cited
U.S. PATENT DOCUMENTS

| 4,160,170 | A | | 7/1979 | Harner et al. |
|---|---|---|---|---|
| 4,193,005 | A | | 3/1980 | Kos et al. |
| 4,366,387 | A | * | 12/1982 | Carter et al. .................. 290/55 |
| 6,137,187 | A | * | 10/2000 | Mikhail et al. ................ 290/44 |
| 7,345,373 | B2 | * | 3/2008 | Delmerico et al. ............ 290/44 |
| 7,352,075 | B2 | * | 4/2008 | Willey et al. .................. 290/44 |
| 2002/0079706 | A1 | * | 6/2002 | Rebsdorf et al. ............. 290/55 |
| 2007/0013193 | A1 | * | 1/2007 | Galloway et al. ............ 290/44 |
| 2007/0120369 | A1 | * | 5/2007 | Delmerico et al. ........... 290/44 |
| 2007/0138796 | A1 | * | 6/2007 | Hornemann et al. ......... 290/44 |

FOREIGN PATENT DOCUMENTS

| DE | 196 35 960 A1 | 12/1998 |
|---|---|---|
| EP | 1 007 844 B1 | 8/1988 |
| EP | 1 007 844 B1 | 8/1998 |

OTHER PUBLICATIONS

"Grid Integration of Wind Energy Conversion Systems", Second Edition, by Siegfried Heier, pp.316 - 363. Copyright 2006, John Wiley & Sons Ltd., The Atrium, Southern Gate, Chichester, West Sussex, England. (This is English translation of non-patent literature document, Cite No. 2, indicated below.

(Continued)

*Primary Examiner*—Julio Gonzalez
(74) *Attorney, Agent, or Firm*—Vidas, Arrett & Steinkraus, P.A.

(57) ABSTRACT

A method for the operation of a wind turbine generator system adapted to be switched into the mains, including a variable-speed rotor, a torque governor, and a governor for the angle of blade attack, characterized in that the speed of the rotor is regulated by varying the angle of attack before the wind turbine generator system is switched into the mains.

11 Claims, 3 Drawing Sheets

OTHER PUBLICATIONS

"Windkraftanlagen Systemauslegung, Netzintegration und Regelung", by Siegfried Heier, Copyright 2005 by B. G. Teubner VerlagGWV Fachverlage GmbH, Wiesbaden, 2003, pp. 322 - 370.

"Regenerative Energiequellen", by Dr. Ing Manfred Kleemann and Professor Dr. Ing. Michael MeliB, 1993, pp. 293 - 298.

Research Report T84-063 "Windenergieanlage Growian II", by Dr. Dieter Braun et al, Bundesminister fur Forschung und Technologie, Apr. 1984.

"Wing Turbines Fundamental, Technologies, Application, Economics", 2nd Edition, 2006, by Erich Hau, pp.92 - 99 and pp. 333 - 341; and pp. 367 - 374; and pp. 381 - 383. (This is English edition of the same book as reference in Cite No. 6).

"Windkraftanlagen: Grundlagen, Technik, Einsatz, Wirtschaftlichkeit", by Dipl. Ing. Erich Hau, 1988, pp. 344 - 349.

Windkraftanlagen: Grundlagen, Technik, Einsatz, Wirtschaftlichkeit, 2nd Edition, 1996, by Dipl. Ing. Erich Hau, 1988, pp. 344 - 349. (This is 2nd Edition text of reference in Cite No. 6).

Wikipedia entry "Regelkreis und Regeldifferenz".

Wikipedia entry of "Schnellaufzahl".

"Wind Energy Hand Book, 8.1 Functions of the Wind-turbine Controller", by Tony Burton et al, 2001, p. 472.

Wikipedia entry "Regelkreis und Regeldifferenz". no date provided.

Wikipedia entry of "Schnellaufzahl". No date provided.

\* cited by examiner

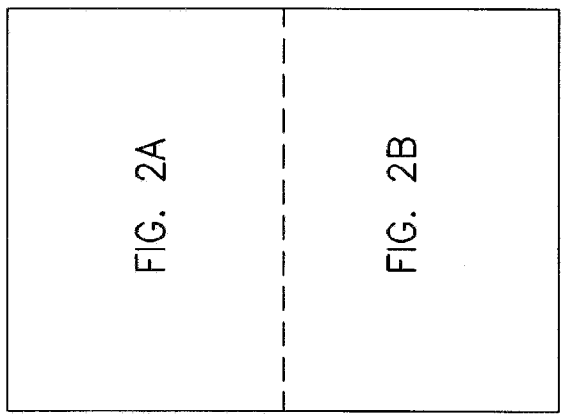
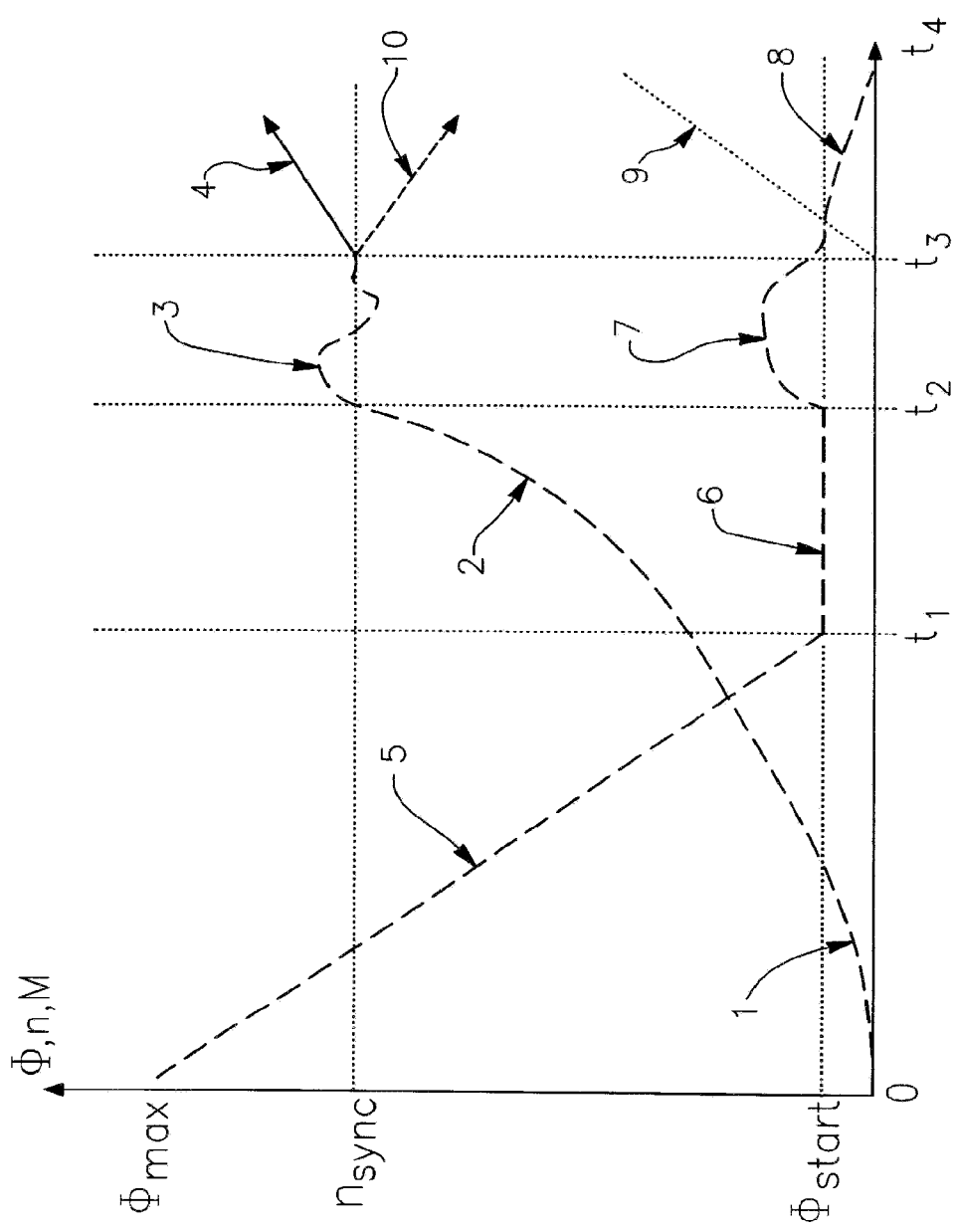

US 7,525,209 B2

METHOD FOR THE OPERATION OF A WIND TURBINE GENERATOR SYSTEM

CROSS-REFERENCE TO RELATED APPLICATIONS

Not applicable.

STATEMENT REGARDING FEDERALLY SPONSORED RESEARCH

Not applicable

BACKGROUND OF THE INVENTION

The invention relates to a method for the speed control of a variable-speed wind turbine generator system by varying the angle of blade attack and torque for the process of switching it into the grid.

Variable-speed wind turbine generator systems including torque governors and governors of the angle of blade attack are known. For a control of the angle of blade attack, each rotor blade is adjusted in its angle of blade attack about its longitudinal axis. If the angles of blade attack vary the rotor blade will take a different torque each from the wind.

For a control/regulation of wind turbine generator systems, it is known to distinguish between two modes of operation. The first mode of operation is referred to as partial-load operation in which a speed control is performed via a predetermined torque. The second mode of operation is full-load operation in which a speed control is performed via an adjustment of the angle of attack.

The speed of the system during a partial-load operation is set to the optimum relationship between the rotor circumferential speed and wind speed ($\lambda_{opt}$) to achieve an optimum power output by the wind turbine generator system. At this time, the rotor blades are set to a blade angle which generates the highest drive torque for the rotor shaft. In the partial-load range, the speed of the rotor is adjusted via the reaction torque as generated on the generator and/or converter.

If the maximum reaction torque is reached on the generator at a rated speed the speed can no longer be maintained at the working point by a further increase to the generator torque. Then, an overload is avoided by deteriorating the aerodynamic efficiency of the blades and taking them out of the optimum angle of attack. Hence, once the maximum generator torque is attained the speed of the rotor is acted on via the angle of blade attack.

To enable an operation of a wind turbine generator system in the partial-load or full-load modes, it is necessary first to switch the system into the grid. A reaction torque cannot be generated on the generator before because currents cannot be impressed onto the generator until there is a connection to the grid. Therefore, as a rule, the rotor of the wind turbine generator system will rotate freely prior to switching it into the grid and an electric connection is established by switching it into the grid and the wind turbine generator system starts getting controlled for a feed of electric energy to the grid.

The switch-in procedure necessitates a certain minimum speed of the generator coupled to the rotor; the so-called synchronization speed $n_{sync}$.

From EP 1 007 844 B1, the entire contents of which is incorporated herein by reference, a variable-speed wind turbine generator system is known which has an induction generator with a wound-coil rotor. For operation management, the known wind turbine generator system is known to have a torque control and a control of the angle of blade attack which works independently of the torque control.

In the known wind turbine generator system, the control of the angle of blade attack adjusts a very large angle of blade attack of 25°, for example, below a certain speed of the generator that is very low and is far below the synchronization speed. This helps ensure that even if the rotor speeds are very low a sufficient torque is taken from the wind in order to set the rotor into motion. Once the predetermined speed, which is very low, is achieved for the generator an angle of blade attack is set which matches with the optimum angle of blade attack for operation in the partial-load range.

Accordingly, in the known wind turbine generator system, a control of the speed via the angle of blade attack is not provided in that speed range in which the switch-in procedure takes place because the angle of blade attack has assumed a fixed value already which was optimized for the partial-load range. Since it is impossible either to influence the speed by predetermining a torque on the generator prior to the switch-in procedure the speed will not be regulated at all prior to the switch-in procedure.

Therefore, it is the object of the invention to provide a method for the operation of a variable-speed wind turbine generator system that improves the switch-in procedure.

BRIEF SUMMARY OF THE INVENTION

The object is achieved by a method for the operation of a wind turbine generator system adapted to be switched into the grid, including a variable-speed rotor, a torque governor, and a governor for the angle of blade attack, characterized in that the speed of the rotor is regulated by varying the angle of attack before the wind turbine generator system is switched into the grid.

This allows to stabilize the speed of the rotor and that of the generator coupled to the rotor with respect to a free rotation. The switch-in procedure becomes easier because both an excessive increase in speed during or before the switch-in procedure and a decrease in speed can be avoided.

According to an aspect, speed control is performed onto a synchronization speed $n_{sync}$ of the generator that is suited for the process of switching it into the grid. As a result, a stabilization of the generator speed is accomplished within a range which is appropriate or is specifically preferred for the switch-in procedure.

In a preferred aspect, speed control starts only after a synchronization speed $n_{sync}$ is exceeded. This allows to choose the angle of blade attack below the synchronization speed $n_{sync}$ independently of such control. At the same time, the control of the angle of blade attack, which involves a certain consumption of energy, is made use of only when the speed requited for the switch-in procedure is really achieved.

It is appropriately provided that if the wind turbine generator system starts up the angle of blade attack is continuously reduced, proceeding from an maximum angle of blade attack $\Phi_{max}$, before speed control begins. This permits to maintain the angle of blade attack within a range suitable for a maximum torque reception from the wind, during the start-up of the wind turbine generator system, i.e. over a large speed range. This allows to bring the wind turbine generator system to a speed required for the switch-in procedure in a faster way than in adjusting the angle of blade attack in a fixed or step-wise manner.

In an aspect such decrease in the angle of blade attack is performed in dependence on speed. This helps ensure that the optimum angle of blade attack is set at any speed. This manner allows to start up the rotor as rapidly as possible even if wind speeds fluctuate.

It is preferred to reduce the angle of blade attack down to a minimum angle of blade attack $\Phi_{start}$. The minimum angle of blade attack $\Phi_{start}$ may be larger here than is the angle of blade attack optimized for partial-load operation. In this case, it is made sure that this torque may be taken additionally from the wind by further reducing the angle of blade attack after the switch-in procedure when the rotor is under an additional load by the reaction torque of the generator. Specifically, the angle of blade attack $\Phi_{start}$ does not fall below a minimum before the system is switched into the grid.

According to an aspect, a provision is made to choose the value of the minimum angle of blade attack $\Phi_{start}$ so as to be dependent upon the wind speed. If there are lower wind speeds, this allows to choose smaller minimum angles of blade attack $\Phi_{start}$ in order to safely achieve the synchronization speed within a predetermined time interval even in case of low wind resources. Furthermore, if wind speeds are high, the selection of a larger angle $\Phi_{start}$ allows to prevent an unnecessarily heavy overrun of speed after the synchronization speed is achieved. The switch-in procedure will then require less setting motions for the blade angle and will run substantially more gently to the mechanical system.

According to an aspect, a provision is made for the angle of blade attack to fall below the minimum angle $\Phi_{start}$ of blade attack after the system is switched into the grid. This allows the control for the angle of blade attack to freely regulate the angle of blade attack into an optimized angle of blade attack over the entire range after the switch-in procedure.

A provision is made that the governor of the angle of blade attack and the torque governor preferably are operated simultaneously after the switch-in procedure.

BRIEF DESCRIPTION OF THE SEVERAL VIEWS OF THE DRAWING

The invention will be described in more detail below with reference to an embodiment and two figures.

FIG. 1 shows the characteristic of the generator speed n, angle of blade attack $\Phi$, and torque M in a common graph as plotted above time t, by way of example FIG. 2 shows a block diagram referring to FIGS. 2A, 2B.

DETAILED DESCRIPTION OF THE INVENTION

Figure 2A:
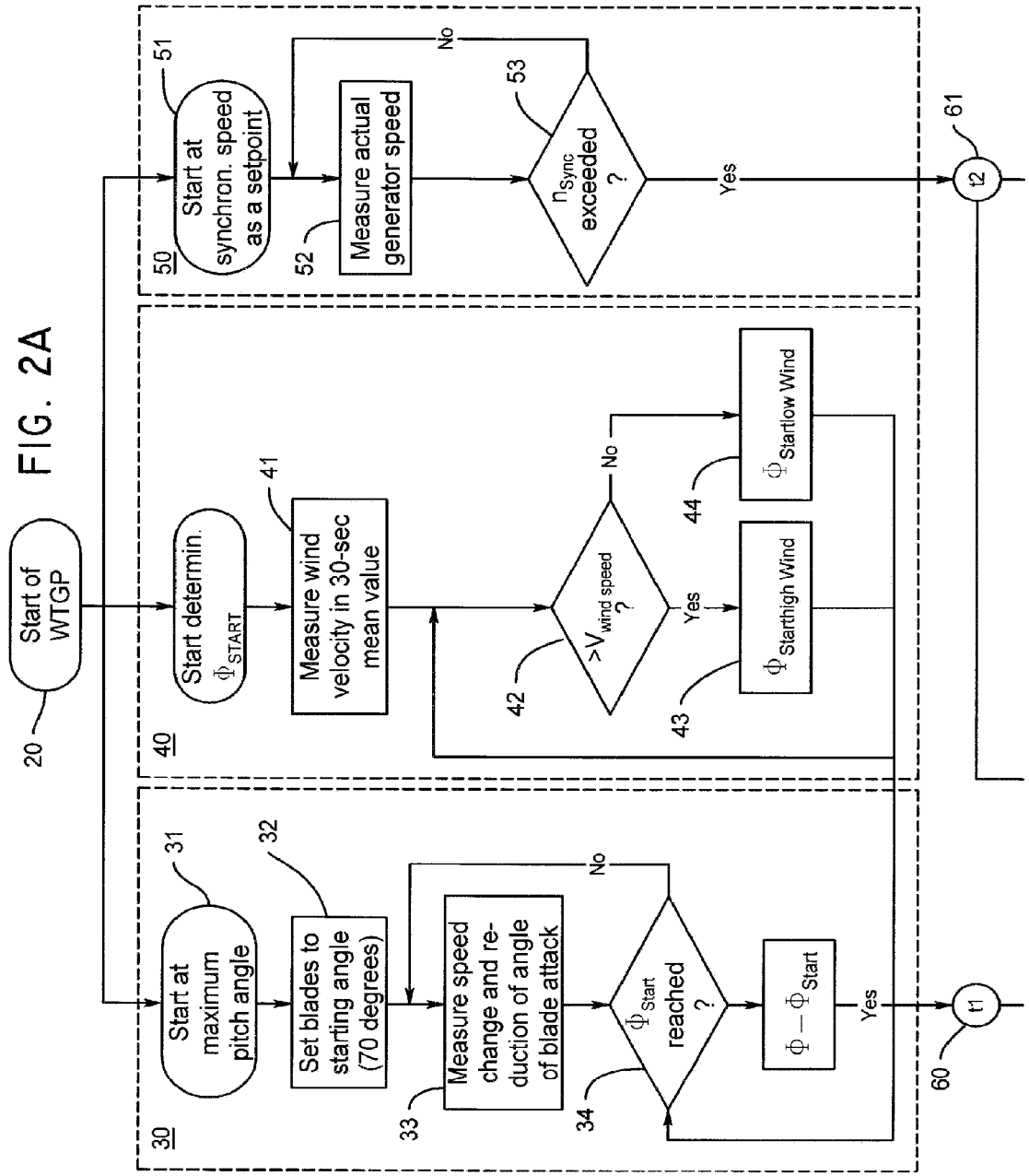
FIGS. 2A, 2B depict the regulation procedures required for the behavior shown in FIG. 1, in a flow chart.
Figure 2B:
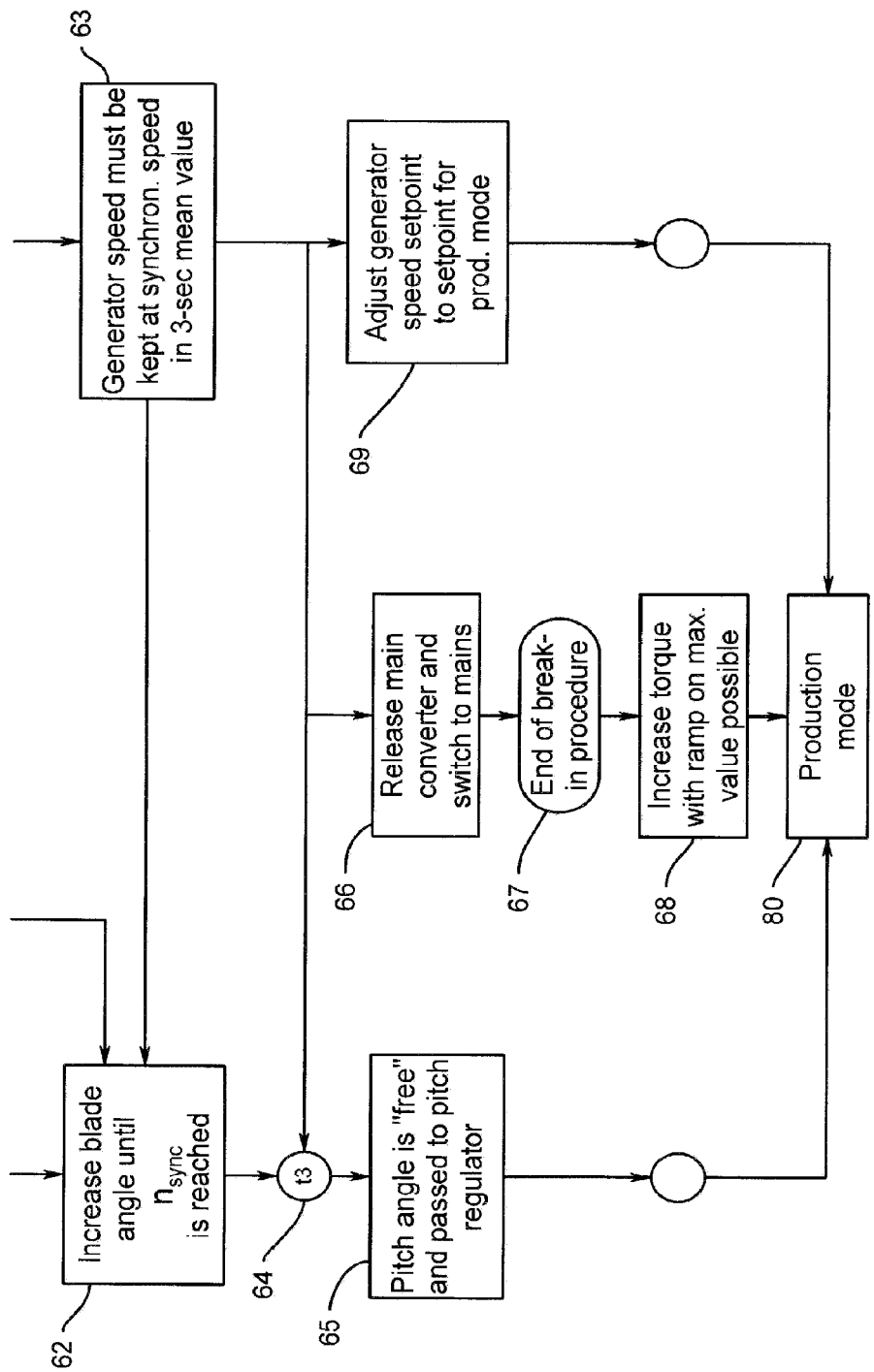

While this invention may be embodied in many different forms, there are described in detail herein a specific preferred embodiment of the invention. This description is an exemplification of the principles of the invention and is not intended to limit the invention to the particular embodiment illustrated The time sector illustrated in FIG. 1 sets in with the start-up of the wind turbine generator system, proceeding from a halted rotor and generator having a speed n=0 as is shown by the start of the curve section 1 at a time t=0. Likewise, the angle of blade attack presents a maximum value angle $\Phi_{max}$ as is shown by the beginning of line 5.

The angle of blade attack is reduced continuously along the line 5 until the minimum value $\Phi_{start}$ is achieved for the angle of blade attack at $t_1$. At the same time, the speed n of the generator rises in a non-linear procedure in conformity with the curve 1

At a time $t_1$, the angle of blade attack is kept constant at $\Phi_{start}$ up to a time $t_2$ according to line 6. During this time period, the generator speed continues to increase according to curve 2 until a synchronization speed $n_{sync}$ is exceeded at $t_2$.

At this time, speed control is fully activated by a variation to the angle of blade attack. The overrun of speed in the curve section 3 is counteracted by increasing the angle of blade attack according to curve 7 while proceeding from the value $\Phi_{start}$. This intervention into regulation helps achieve the synchronization speed $n_{sync}$ at a time $t_3$.

The wind turbine generator system is also switched into the grid at the time $t_3$. As is shown in the drawing the switch-in procedure is always performed at the synchronization speed $n_{sync}$. Line 9 illustrated by dots shows the torque predetermined by the generator which rises linearly, starting from the value of zero. The gradient of rise is parametrized within the possible limits.

The generator speed continues to increase as is shown in curve section 4 after the switching procedure into the grid. At the same time, the angle of blade attack is further decreased along the curve 8 while starting from the value $\Phi_{start}$ in order to achieve an optimum power output. It can be appreciated that the control for the angle of blade attack and torque control are active simultaneously after the point of switching into the grid $t_3$. In particular, the control for the angle of blade attack checks the angle of blade attack continually. This check also includes a safety aspect because if the wind is strong a rapid intervention into regulation might possibly be necessary to avoid excessively high speeds.

Another situation exists if wind speeds are very low and at which an increasing speed cannot be achieved after switching into the mains.

In this case, the system will remain in the grid even if the speed lowers below the synchronization speed as is depicted in the dotted curve section.

The processes during the start-up of the wind turbine generator system are shown in a flow chart beginning from a start command for the wind turbine generator system at 20 and ending with production mode at 80. The upper half of the flow chart illustrates three procedures in parallel which are released following the start command. They firstly comprise a regulation of the angle of blade attack (also called a pitch angle) in the box 30 surrounded by a dashed line, secondly the determination of an angle of blade attack $\Phi_{start}$ in the box designated 40, and thirdly the monitoring of the generator speed in the box designated 50.

The regulation of the angle of blade attack in the box designated 30 begins at 31 at a position where the angle of blade attack has a maximum value. The angle of blade attack is set to a starting angle of 70° at 32. This starting angle matches the angle of blade attack indicated by $\Phi_{max}$ in FIG. 1. The variation in speed is measured continually in the loop formed from 33 and 34 and the angle of blade attack is reduced in dependence on speed until the starting value $\Phi_{start}$ is reached.

The value predetermined for $\Phi_{start}$ is determined in the box designated 40 at the same time. To this end, a 30-second mean value of wind speed is measured at 41. If this mean value exceeds a predetermined wind speed $V_{wind\,speed}$ at 42 $\Phi_{start}$ is set to a value $\Phi_{starthighwind}$ at 43, otherwise to a lower value $\Phi_{startlowwind}$ at 44. If the value $\Phi_{start}$ predetermined for the angle of blade attack is reached inside the box designated 30 the system, at the time $t_1$ at 60, is in a state which matches the time which is designated $t_1$ as well in FIG. 1.

The generator speed is monitored in the box designated 50. For this purpose, a synchronization speed $n_{sync}$ initially is predetermined as a setpoint at 51. The actual generator speed is measured continually at 52, and a continued check is made at 53 as to whether the synchronization speed $n_{sync}$ is exceeded. If this is the case the wind turbine generator system, at the time $t_2$ at 61, is in a state which matches the time which is designated $t_2$ as well in FIG. 1.

The angle of blade attack initially is enlarged at 62 to counteract an overrun of speed beyond the synchronization speed $n_{sync}$. The speed is controlled by varying the angle of blade attack up to the synchronization speed $n_{sync}$. A check is made at 63 as to whether the synchronization speed is also maintained in a 3-second mean value, i.e. whether the speed requited for the switch-in procedure has been stabilized adequately In this case, the wind turbine generator system, at the time $t_3$ at 64, is in a state which matches the time which is designated $t_3$ as well in FIG. 1

At this time, the control for the angle of blade attack is released, which means that angles of blade attack which are below the starting value $\Phi_{start}$ can also be adjusted for a maximum torque reception from the wind and the control of the angle of blade attack no longer serves for maintaining the synchronization speed $n_{sync}$ as still was done at 62.

Also at a time $t_3$, the switch-in procedure proper is performed at 66, i.e. the main converter is set working and the system is connected to the grid. This terminates the switch-h procedure at 67. It is shown at 68 that the generator torque is increased to a maximum value possible along a ramp.

A simultaneous change is made to the setpoint of the generator speed at the time $t_3$ at 69. This speed is set by the synchronization speed $n_{sync}$ to a setpoint for production mode. Thus, the wind turbine generator system will be in the production mode indicated by 80.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents axe intended to be encompassed by the claims attached hereto

What is claimed is:

1. A method for the operation of a wind turbine generator system adapted to be switched into a grid, including a variable-speed rotor, a torque governor, and a governor for the angle of blade attack, characterized in that the speed of the rotor is regulated by varying the angle of attack before the wind turbine generator system is switched into the grid, wherein said speed of the rotor is controlled to a synchronization speed $n_{sync}$ of the generator that is suited for the process of switching the wind turbine generator system to the grid.

2. The method according to claim 1, characterized in that speed control is performed to a synchronization speed $n_{sync}$ of the generator that is suited for the process of switching the wind turbine generator system into the grid.

3. The method according to claim 1, characterized in that speed control starts after a synchronization speed $n_{sync}$ is exceeded.

4. The method according to claim 1, characterized in that the wind turbine generator system starts up a continuous reduction in the angle of blade attack, proceeding from an maximum angle of blade attack, before speed control begins.

5. The method according to claim 4, characterized in that said reduction in the angle of blade attack is performed in dependence on speed.

6. The method according to claim 4, characterized in that the reduction in the angle of blade attack is carried out till a minimum angle $\Phi_{start}$ of blade attack.

7. The method according to claim 6, characterized in that the minimum angle $\Phi_{start}$ of blade attack is dependent upon the wind speed.

8. The method according to claim 4, characterized in that the angle of blade attack falls below the minimum angle $\Phi_{start}$ of blade attack after the system is switched into the grid.

9. The method according to claim 1, characterized in that the governor of the angle of blade attack and the torque governor are operated simultaneously after the wind turbine generator system is switched into the grid.

10. The method according to claim 1, characterized in that an angle $\Phi_{start}$ of blade attack does not fall below a minimum before the system is switched into the grid.

11. A method for the operation of a wind turbine generator system adapted to be switched into a grid, including a variable-speed rotor, a torque governor, and a governor for the angle of blade attack, characterized in that the speed of the rotor is regulated by varying the angle of attack before the wind turbine generator system is switched into the grid, wherein said speed of the rotor is controlled to a predetermined speed that is suited for switching the generator to the grid, and the generator is connected to the grid when the predetermined speed has become stable.

* * * * *